United States Patent Office 3,804,797
Patented Apr. 16, 1974

3,804,797
COATING COMPOSITIONS COMPRISING CYCLIC SULFONIUM ZWITTERIONS WITH CARBOXY CONTAINING POLYMERS
William E. Broxterman, Donald L. Schmidt, and Syamalarao Evani, Midland, Mich., assignors to The Dow Chemical Company, Midland, Mich.
No Drawing. Filed Sept. 13, 1972, Ser. No. 288,700
Int. Cl. C07d 3/74, 11/02
U.S. Cl. 260—29.6 Z        11 Claims

ABSTRACT OF THE DISCLOSURE

Desirable binder or coating compositions comprise combinations of cyclic sulfonium zwitterions and water-soluble or alcohol-soluble polymers containing a plurality of carboxylic acid groups. Printing inks incorporate water- or alcohol-soluble dyes or water-dispersible pigments with such binder compositions. The compositions cure readily to provide water-resistant, adherent products when dried.

Background of the invention

In the past, printing inks, particularly inks designed for high speed rotogravure or flexographic printing, have been formulated with volatile organic solvents. Such solvents have presented hazards of toxicity and flammability in the press rom and even with adequate ventilation facilities it is considered undesirable to release such solvents into the atmosphere. It has been suggested to employ water-based printing inks to avoid such hazards. However, up to the present, it has been difficult to produce a water-based printing ink which will dry sufficiently rapidly and which incorporates an adequate pigment binder to provide desirable dry rub and wet rub resistance.

In recent years a variety of water-based coating compositions have been based on resins containing a sufficient content of carboxyl groups so that the resin may be rendered water-soluble by formation of alkali metal, ammonium or amine salts of said carboxyl groups. In particular, with ammonium or volatile amine salts of such carboxyl containing polymers, water-based coating compositions, such as floor polishes, have been formulated whereby the coating is fixed by evaporation of water and loss of ammonia or volatile amine. However, such coatings are generally sufficiently hydrophilic as to be excessively sensitive to water even after drying.

U.S. Pat. 3,544,499 teaches the broad concept of the use of certain water-soluble sulfonium salts with various water-soluble anionic polymers to produce water-based pigment binder compositions. However, in thermal curing of compositions, in accordance with this latter patent, sulfur compounds such as dialkyl sulfides and the like are generally released and must be disposed of. Further, this patent does not disclose any identifiable compounds which contain sulfur bonded directly to an aromatic ring as required in the sulfonium compounds employed in the present invention, as defined below.

Summary of the invention

In accordance with the present invention there are provided compositions comprising a cyclic sulfonium zwitterion compound and a polymer containing a plurality of carboxylic acid groups. In one embodiment of the invention a cyclic sulfonium zwitterion compound or a mixture of such compounds is combined with a solution of a water-soluble anionic polymer to provide a binder composition which sets readily on drying even at room temperature or which may be cured to a water-resistant coating by mild heating. In a further embodiment an alcohol-soluble cyclic sulfonium zwitterion compound is blended with an alcohol solution of a polymer containing a plurality of carboxylic acid groups to provide a film-forming composition which cures readily to produce a solvent-resistant, adherent coating.

More specifically, the compositions of the invention comprise:

(A) A water-soluble or alcohol-soluble, thermally polymerizable monomer consisting of at least one cyclic sulfonium zwitterion of the formula:

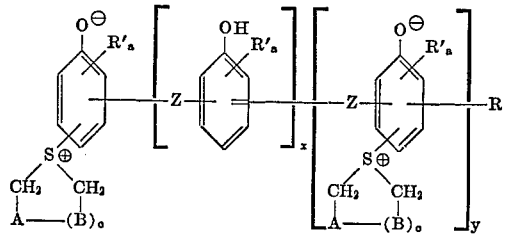

where
R is H, Cl, Br, OH or —$OC_1$–$C_4$ alkyl;
R' is H, Cl, Br or $C_1$–$C_4$ alkyl and $a$ is an integer of from 0 to 2;
each sulfonium group is ortho or para to the phenoxide group;
A and B are —$CH_2$— or —CHR'—, and $c$ is 1 or 2;
Z is a bridging group of the formula:
  (1) —O—, —S— or —O($C_mH_{2m}$)O— where $m$ is 1 to 6 and the sum of $x+y$ is from 0 to 1;
  (2) —$CR_2''$— where R'' is $C_1$–$C_4$ alkyl and the sum of $x+y$ is from 0 to 1 or
  (3) —$CH_2$— where $(x+y)=0$ to 20; and (B) A water-soluble anionic polymer containing a plurality of carboxylic acid groups. The term "water-soluble polymer" as employed in the present specification and claims is inclusive of polymers rendered soluble in ammoniacal solution.

Optionally the compositions may contain a compatible water-soluble dye or, preferably, water-dispersible pigment. The term "compatible" as employed in this connection herein refers to a dye or pigment which is not adversely reactive with the sulfonium zwitterion or the anionic polymer constituents of the binder composition as, for example, by reacting to adversely affect the color or dispersibility of the dye or pigment.

Suitable cyclic sulfonium zwitterions for use in the compositions of the present invention and methods for their preparation are disclosed in U.S. Pats. 3,636,052 and 3,660,431. It should be noted that the above Formula I covers both monosulfonium and polysulfonium compounds. Thus, for example, when the sum $x+y$ therein equals zero said formula symbolizes monofunctional sulfonium zwitterions bearing substituents R and $R'_a$ on the aromatic ring. Similarly when $y$ equals 1 the formula sets forth a difunctional sulfonium zwitterion and when $y$ is greater than 1 a higher polyfunctional sulfonium zwitterion is indicated. Representative monofunctional cyclic sulfonium compounds useful herein are the inner salts of 1 - (4 - hydroxyphenyl)tetrahydrothiophenium hydroxide, 1-(4 - hydroxy - 3 - methylphenyl)tetrahydrothiophenium hydroxide, 1 - (3,5 - dichloro - 4 - hydroxyphenyl)tetrahydrothiophenium hydroxide and 1-(2,4-dihydroxyphenyl) tetrahydrothiophenium hydroxide. Representative difunctional cyclic sulfonium compounds include 1,1' - (isopropylidenebis(4 - hydroxy - o - phenylene)bis(tetrahydrothiophenium hydroxide)bis(inner salt), 1,1' - methylenebis(4 - hydroxy - m - phenylene))bis(tetrahydrothiophenium hydroxide)bis(inner salt) and 1,1' - (ethylenedioxybis (4 - hydroxy - o - phenylene))bis(tetrahydrothiophenium hydroxide)bis(inner salt).

Suitable water-soluble anionic polymers are substantially linear polymers having molecular weights of from about 2000 to about 500,000 and bearing sufficient ionizable anionic groups on the polymer chain to provide the desired degree of water-solubility. Such polymers preferably contain a plurality of carboxylic acid groups to confer the necessary hydrophilic nature on the polymer. Alternatively, said polymer may contain only sufficient carboxylic acid moieties as are needed for reaction sites with the cyclic sulfonium zwitterion and additional hydrophilic nature as needed can be introduced by copolymerization with a suitable water-soluble monomer. However, in such copolymers it is essential that any hydrophilic moieties other than carboxylic acid moieties be kept at a minimum in order that films formed by reaction of the sulfonium zwitterions with the carboxyl groups will thereafter be insensitive to wetting. Suitable anionic polymers include polyacrylic acid and polymethacrylic acid as well as copolymers of α-olefins such as ethylene or isobutylene with maleic acid, copolymers of vinyl aromatic hydrocarbons such as styrene, α-methyl styrene, vinyl toluene or the like with maleic anhydride or with acrylic or methacrylic acid, copolymers of acrylic or methacrylic acid with acrylamide, vinyl ketones, vinyl alkanoates or vinyl pyrrolidone and the like. Likewise, the carboxylic acid polymers may be terpolymers such as the terpolymers of acrylic acid with styrene and an alkyl acrylate and with various others of the foregoing monomers. In general, such anionic polymers are employed in aqueous compositions in the form of water-soluble salts such as alkali metal salts or, preferably, in the form of ammonium salts. For alcoholic compositions the free acid form of the carboxylic polymers is generally preferred.

The anionic polymers can be prepared in conventional fashion by polymerization or copolymerization of the corresponding ethylenically unsaturated monomers, usually with the aid of a peroxide catalyst such as ammonium persulfate or tertiary butyl hydroperoxide. Alternately, anionic polymers may be prepared indirectly as, for example, by polymerizing acrylonitrile and hydrolyzing the resulting polyacrylonitrile with strong alkali such as sodium hydroxide. In the case of the olefin-maleate copolymers, it is generally desirable to copolymerize an α-olefin such as styrene with maleic anhydride and thereafter to render the polymer water-soluble by opening the anhydride rings in known manner. Thus, direct hydrolysis of the anhydride ring yields the polymer in the acid form. Improved solubility in water is obtained by forming the ammonium salt from such an acid polymer. Alternately, the anhydride form of the polymer may be treated with ammonia to produce the water-soluble half amide-half ammonium salt form. In a further alternative, the anhydride form of such polymers may be reacted with an aliphatic hydroxyl compound to form a half ester which is subsequently reacted with a base to form the half ester-half salt.

It is among the advantages of the invention that the particular anionic polymer employed provides for producing coating compositions having a wide range of viscosity properties. Thus, for example, if a very low viscosity composition is desired, the anionic polymer can be one of the predominant hydrophobic copolymers containing only a small proportion of carboxylic acid groups in the free acid form and the coating composition is prepared in an alcohol solvent. On the other hand, if more viscous coating compositions are desired, any of the various water-soluble polycarboxylic polymers may be employed and the viscosity of the solution increased by increasing the molecular weight of the anionic polymer.

In practice, the coating compositions are prepared by blending an aqueous or alcoholic solution of one of the cyclic sulfonium zwitterions with an aqueous or alcoholic solution of one or more anionic polymers containing a plurality of carboxyl groups. The proportions of the ingredients will vary depending upon the composition of the anionic polymer employed and on the degree of hydrophobicity desired in the finished coating. Even relatively small proportions of sulfonium compound provide some benefit; however, in general, it is desirable to employ from about 0.3, preferably from 0.5 to about 1.5 stoichiometric equivalents of a monofunctional sulfonium zwitterion for each chemical equivalent of carboxyl function in the anionic polymer. When employing difunctional or polyfunctional sulfonium zwitterions, cross-linking of the anionic polymer chains will occur and good hydrophobicity can be obtained with as little as 0.1 equivalent of the polyfunctional sulfonium compound per equivalent of carboxyl group in the anionic polymer.

For the preparation of printing inks or pigmented coatings any of the various conventional water-dispersible pigments may be employed provided that the pigment is not of such a nature as to be adversely chemically reactive with the sulfonium zwitterion or with the anionic polymer as discussed above. Such pigments are usually obtainable in the form of a paste or aqueous dispersion of the finely divided pigment particles in which case the pigment dispersion is conveniently blended with the anionic polymer solution or dispersion prior to the addition of the sulfonium zwitterion compound. When employing certain anionic polymers, such as polyacrylic or polymethacrylic acids in their ammonium salt forms, the molecular weight of the polymer may be chosen so that said polymer serves as a dispersing agent for the pigment. In such cases, dry pigment in finely divided form may be stirred into a solution of the polymer salt and homogenized in a pigment mill or colloid mill. The requisite amount of sulfonium zwitterion compound is then blended into the pigment dispersion to provide the finished coating composition.

Water and alcohols stabilize the cyclic sulfonium compounds and prevent substantial homopolymerization thereof. Any alcohol can be employed in coating compositions provided it has sufficient volatility for the desired curing conditions. In general, alkanols containing from 1 to about 5 carbon atoms or glycol ethers such as the monoalkyl (1–3 C) ethers of ethylene glycol or diethylene glycol are preferred alcoholic solvents. When the coating compositions are dried the cyclic sulfonium compounds react with carboxylic acid groups of the anionic polymer to render the latter hydrophobic in accordance with the following general reactions:

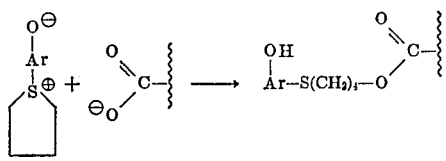

If the sulfonium compound is a difunctional sulfonium compound, a similar reaction of the second sulfonium ring with a carboxyl on another molecule of anionic polymer will produce cross-linking. It is an advantage of the present invention that the above reactions proceed readily at room temperature or at only slightly elevated temperatures. It is a further surprising advantage that aqueous printing ink compositions of the present invention set to give a satisfactory resistance to dry rub even before the print has been completely dried and cured in accordance with the above reaction.

The following examples illustrate the invention but are not to be construed as limiting. All percentages and parts are by weight unless otherwise indicated.

EXAMPLE 1

One gram of a copolymer prepared by copolymerization of 50 parts of butyl acrylate with 20 parts of styrene and 30 parts of acrylic acid was dissolved in sufficient propanol to provide a solution containing 66.6 percent of polymer solids. Said alcoholic solution was mixed with a solution of 0.81 gram of the 1,1'(ethylenedioxybis(4 - hydroxy - o - phenylene))bis(tetrahydrothiophenium hydroxide)bis(inner salt) of the formula:

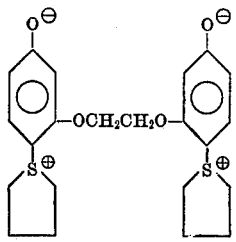

in 1 gram of diethylene glycol monoethyl ether. The resulting mixture was a homogeneous solution containing about equal chemical equivalents of sulfonium ions and carboxylate moieties and was applied as a film to a mild steel test plate. The solvent was evaporated and the film was then cured for 5 minutes at a temperature of 170° C. The resulting clear, smooth coating was insoluble in methanol, acetone or methylene chloride, had a Kentron-Knoop hardness of 18.6 (ASTM Method D–1474–62T) and withstood an impact of 160 inch-pounds. When the copolymer solution without the sulfonium compound was applied and cured under the same conditions, the resulting film was tacky and was soluble in methanol.

EXAMPLE 2

The procedure of Example 1 was repeated employing the same weight of copolymer but only 0.40 gram of the cyclic sulfonium compound. The resulting coating was insoluble in methanol, acetone or methylene chloride, had a Kentron-Knoop hardness of 18 and withstood an impact of 160 inch-pounds. A further replicate using only 0.2 gram of the cyclic sulfonium compound also gave a good coating insoluble in the named solvents and having a Kentron-Knoop hardness of 14.

EXAMPLE 3

A copolymer of 88 parts of methyl methacrylate with 12 parts of acrylic acid was dissolved in a mixture of equal parts of ethanol and water containing two stoichiometric equivalents of ammonium hydroxide based on the carboxyl content of the copolymer to provide a solution containing about 17 percent of said copolymer. An aqueous solution of the difunctional sulfonium zwitterion compound of Example 1 was blended with separate portions of said copolymer solution to provide coating solutions wherein the sulfonium compound constituted 30 percent, 50 percent and 75 percent, respectively, of the total solids. Each coating solution was applied to a test plate and the coating was cured at 80° C. for 20 minutes. Clear to slightly cloudy coatings were obtained having acceptable hardness. Each of the coated test plates was immersed in water at room temperature for 24 hours without observable detrimental effect. When the procedure was repeated employing a coating solution containing the same amount of copolymer but only 10 percent of the sulfonium zwitterion compound good film-forming was obtained but after 24 hours exposure to water the film had lost some adhesion so that a portion could be readily scraped from the test plate.

EXAMPLE 4

The ethanol-water solution of the anionic copolymer of Example 3 was blended with sufficient of the 1-(4-hydroxy-3-methylphenyl)tetrahydrothiophenium hydroxide (inner salt) having the formula:

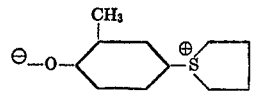

to provide 1.1 chemical equivalents of sulfonium zwitterion per equivalent of carboxylic acid in the copolymer. The resulting coating solution was applied to a test plate and cured as in Example 3 to provide a coating of good quality which showed only slight blushing of the finish when immersed in water for 24 hours.

EXAMPLE 5

Solution A

Ten grams of a copolymer of 2 molar proportions of styrene with 1 molar proportion of maleic anhydride was suspended in 80 grams of water and heated at 90°–95° C. for about 4 hours to hydrolyze the anhydride groups to carboxylic acid groups. The resulting mixture was cooled to room temperature and neutralized with 5 grams of concentrated ammonium hydroxide (28% $NH_3$) to obtain a clear solution of the copolymer which was then made up with distilled water to a finished solution weight of 100 grams. The styrene-maleic anhydride copolymer employed was characterized by a viscosity of 2.5 centipoises for a 10% solution thereof in methyl ethyl ketone.

Solution B 306 grams of the styrene-maleic anhydride copolymer employed in Solution A was heated at 180°–200° C. under nitrogen with 150 grams of a surfactant alcohol, obtained by condensing four moles of ethylene oxide with one mole of nonylphenol, to produce the partial ester of the copolymer. The polymeric partial ester was cooled to room temperature and crushed to a powder. Fifteen grams of the powdered partial ester was suspended in water and neutralized with ammonium hydroxide to form a clear solution of the partial ester-ammonium salt of the copolymer. This solution was made up to 100 grams with distilled water.

Coating compositions: An aqueous concentrate of the 1-(4-hydroxy-3 - methylphenyl)tetrahydrothiophenium hydroxide (inner salt), hereinafter called sulfonium zwitterion, was added in varying proportions to Solution A or Solution B above to provide a series of coating compositions containing various ratios of sulfonium zwitterion to styrene-maleate copolymer. The resulting compositions were applied as thin coatings on glass plates and on mild steel plates. The coatings were tested for water sensitivity after drying at room temperature (20°–25° C.) for 24 hours or 65 hours or after drying at elevated temperatures for short periods. The results are summarized in the following tables.

TABLE I

| Parts by weight of active ingredients in the composition | | Curing cycle | | |
|---|---|---|---|---|
| Sulfonium zwitterion | Solution A | Temp., ° C. | Time, min. | Characteristics of the cured film on glass plate |
| --------- | 100 | 75 | 5 | Brittle flakes, water soluble. |
| 33.3 | 66.6 | 75 | 5 | Clear hard coating, water insensitive. |
| 33 | 66.6 | 75 | 10 | Do. |
| --------- | --------- | 100 | 5 | Do. |
| --------- | --------- | 100 | 3 | Do. |
| --------- | 100 | 100 | 3 | Brittle flakes, water swellable. |
| 25 | 75 | 100 | 7.5 | Clear hard coating, water insensitive. |
| 190 | --------- | 100 | 5 | Waxy coating, water insensitive. |

TABLE II

| Parts by weight of active ingredients in coating composition | | Characteristics of coating dried at 80° C. for 20 minutes—water soak test |
|---|---|---|
| Sulfonium zwitterion | Solution B | |
| 0 | 100 | Film was soluble. |
| 10 | 90 | Do. |
| 15 | 85 | Film partly swollen. |
| 20 | 80 | Blushing in 20 minutes. |
| 25 | 75 | Blushing in 45 minutes. |
| 30 | 70 | Blushing in 16 hours. |
| 35 | 65 | Water-insensitive, 16 hours. |
| 40 | 60 | Do. |
| 50 | 50 | Do. |

The above Water Soak Test was conducted by immersing the coated plates in water at room temperature.

When the coatings were dried at room temperature for 65 hours, all compositions containing 20 percent or more of the sulfonium zwitterion gave resistance to water spotting while 35 percent or more of the zwitterion was required to provide resistance to water spotting when the films were dried for only 24 hours at room temperature.

When an ammonium salt of a polyacrylic acid having a molecular weight of about 10,000–20,000 or of a polymethacrylic acid having a molecular weight of about 15,000–25,000 is substituted for the salt of the styrene-maleic anhydride copolymer in the above compositions, similar coating compositions producing desirable hydrophobic coatings are obtained except that a higher minimum proportion of cyclic sulfonium zwitterion compound is required, taking account of the low chemical equivalent weight per carboxyl group in the polyacrylic and polymethacrylic acids.

EXAMPLE 6

A printing ink formulation having a binder to pigment ratio of 1:1 was prepared by blending and milling together 5 grams of aqueous 20% solution of the ammonium salt of the half-ester from a styrene-maleic anhydride copolymer as employed in Solution B of Examples 5, 1.19 grams of 84% pure 1-(4-hydroxy-3-methylphenyl)tetrahydrothiophenium hydroxide (inner salt) in 4 grams of water and 6.7 grams of an aqueous 30% dispersion of carbon black pigment (Aquablack 115, Cities Service Company). The resulting composition was employed as ink supply to a laboratory gravure printing machine and test sheets were printed therewith. The printed portion of the test sheets gave a satisfactory dry rub resistance within 5 to 10 seconds after printing when held at room temperature. Satisfactory wet rub resistance developed when the printed sheets were dried at 100° C. for 30 seconds or held at room temperature for 24 hours.

EXAMPLE 7

A partially esterified styrene-maleic anhydride copolymer similar to that employed in Solution B of Example 5 was dissolved in aqueous ammonia solution for use in a water-based printing ink. The polymer had the approximate composition of 67 mole percent styrene, 21 mole percent of the half amide-half ammonium salt of maleic acid and 12 mole percent of the half ester-half ammonium salt of maleic acid. This anionic copolymer solution was employed as a concentrate to prepare the following formulations in which the above-described copolymer is identified as SMA-2A.

Formulation C: Grams
SMA-2A _____ 8.34
Sulfonium zwitterion from Example 6 _____ 3.32
Aqueous 30% carbon black dispersion _____ 11.64
Deionized water _____ 69.9

This printing ink formulation contained 25% solids and was characterized by a viscosity measured by a drainage time of 24 seconds through a No. 4 Ford Cup. The formulation was used to print test sheets with a Ballard gravure cylinder on a fairly good quality 30-lb. opaque paper. The printing set to a satisfactory dry rub resistance in 45 seconds at room temperature.

Formulation D: Grams
SMA-2A _____ 20
Ethylenedioxybis sulfonium compound of Example 1 _____ 12
Sulfonium zwitterion of Example 6 _____ 8
Deionized water _____ 126.7

Formulation E: Grams
SMA-2A _____ 15
Ethylenedioxybis sulfonium compound of Example 1 _____ 15
Deionized water _____ 90

Formulations D and E were run as unpigmented top coats on printed labels and were found to have satisfactory low set times to dry rub resistance.

EXAMPLE 8

A polyfunctional cyclic sulfonium zwitterion mixture having an average composition represented by the formula

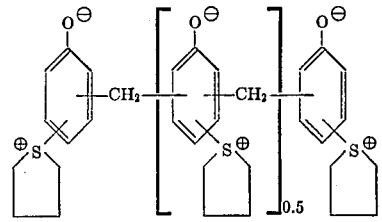

was prepared in the form of a hydrate by the general method of Example 3(A) of U.S. Pat. 3,660,431 by reacting one molar proportion of novolac resin having a degree of polymerization of 2.5 was reacted with about 2.75 molar proportions (10% molar excess) of tetrahydrothiophene oxide and an excess of dry HCl and passing the product through an ion-exchange resin in the hydroxide form. The resulting sulfonium zwitterion product was shown by elemental analysis and by nuclear magnetic resonance analysis to have substantially the above composition. A portion of this product was dissolved in methanol to prepare an alcoholic solution containing 40.4% by weight of sulfonium zwitterion solids and the resulting solution was blended to form a coating composition with an aqueous ammoniacal solution containing 32.5% by weight of an anionic copolymer prepared by copolymerizing 45% by weight of methyl methacrylate with 25% of butyl acrylate and 30% of acrylic acid. The ammoniacal solution contained sufficient ammonium hydroxide to solubilize the anionic copolymer. 6.4 grams of the alcoholic solution of polyfunctional sulfonium zwitterion was blended with 10.9 grams of the solution of anionic polymer to provide in the mixture about one chemical equivalent of sulfonium ion for each chemical equivalent of carboxyl group therein and the resulting composition was cast on a test plate to give a dried film about one mil in thickness. The film was cured for 20 minutes at 80° C. and was then found to be insensitive to water, acetone and methylene chloride.

EXAMPLE 9

One gram of the difunctional cyclic sulfonium zwitterion prepared from bisphenol A and having the formula

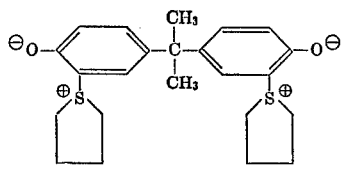

was dissolved in 2 grams of the monoethyl ether of ethylene glycol and the solution mixed with 10 grams of a methanolic solution containing 30% by weight of a copolymer of 33% methyl methacrylate, 55% butyl acrylate and 12% of acrylic acid. The resulting coating composition was applied to a test plate and dried and cured at 125° C. for 40 minutes to produce a smooth coating insoluble in water.

The compositions of the invention lend themselves to a diversity of coating and binder uses since the properties of the aqueous or alcoholic composition and of coatings obtained therefrom can be varied by varying the proportions of total solids in said composition, the proportions of anionic polymer to sulfonium compound, the proportions of pigment to binder and the molecular weight or composition of the anionic polymer. Also various auxiliary agents such as pigment dispersants or viscosity modifiers can be incorporated in the compositions. Preferred compositions are aqueous solutions of the binder constituents having a pigment dispersed therein to provide a composition containing from about 10 to about 50 percent of solids wherein said solids comprise from about 10 to about 50 percent of pigment, from about 5 to about 40 percent of anionic polymer and from about 5 to about 50 percent by weight of cyclic sulfonium zwitterion compound. In any case it is preferred that the cyclic sulfonium zwitterion be incorporated in an amount sufficient to render dried films cast from said compositions insoluble in water.

We claim:
1. A binder composition which comprises an aqueous or alcoholic solution of respectively (1) a water-soluble or alcohol-soluble anionic polymer of ethylenically unsaturated monomers, said polymer containing a plurality of carboxylic acid groups and (2) a water-soluble or alcohol-soluble cyclic sulfonium zwitterion compound having the formula:

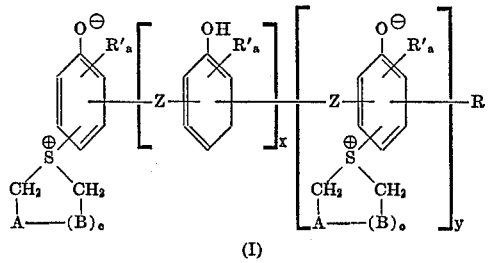

(I)

where
R is H, Cl, Br, OH or —$OC_1$–$C_4$ alkyl;
R' is H, Cl, Br or $C_1$–$C_4$ alkyl and $a$ is an integer of from 0 to 2;
each sulfonium group is ortho or para to the phenoxide group;
A and B are —$CH_2$— or —CHR', and $c$ is 1 or 2;
Z is a bridging group of the formula:
  (1) —O—, —S— or —O($C_mH_{2m}$)O— where $m$ is 1 to 6 and the sum of $x+y$ is from 0 to 1;
  (2) —$CR_2''$— where R'' is $C_1$–$C_4$ alkyl and the sum of $x+y$ is from 0 to 1 or
  (3) —$CH_2$— where $(x+y)=0$ to 20.

2. A composition according to claim 1 wherein the anionic polymer is in the ammonium salt form.
3. A composition according to claim 1 wherein the cyclic sulfonium zwitterion is employed in amount sufficient to render dried films cast from said composition insoluble in water.
4. A composition according to claim 1 wherein for each chemical equivalent of carboxyl group in the anionic polymer in the composition there is present at least about 0.3 chemical equivalent of a monofunctional cyclic sulfonium zwitterion or at least about 0.1 chemical equivalent of a difunctional cyclic sulfonium zwitterion.
5. A composition according to claim 1 which includes a water-dispersible pigment.
6. A composition according to claim 1 which includes a water-soluble dye.
7. A composition according to claim 1 wherein the anionic polymer is the ammonium salt of a styrene-maleic anhydride copolymer or the ammonium salt of a half ester or half amide of said copolymer.
8. A composition according to claim 1 wherein the anionic polymer is the ammonium salt of polyacrylic acid or polymethacrylic acid.
9. A composition according to claim 7 wherein the cyclic sulfonium compound is 1-(4-hydroxy-3-methylphenyl)-tetrahydrothiophenium hydroxide (inner salt) or 1-(4-hydroxyphenyl)tetrahydrothiophenium hydroxide (inner salt).
10. A composition according to claim 7 wherein the cyclic sulfonium compound is 1,1'-(ethylenedioxybis(4-hydroxy-o-phenylene))bis(tetrahydrothiophenium hydroxide)bis(inner salt).
11. A composition according to claim 1 wherein the solution contains from about 10 to about 50 percent of solids and said solids comprise from about 10 to about 50 percent of pigment, from about 5 to about 40 percent of anionic polymer and from about 5 to about 50 percent of cyclic sulfonium zwitterion compound.

References Cited
UNITED STATES PATENTS
3,544,499  12/1970  Hatch et al.

WILLIAM H. SHORT, Primary Examiner
P. F. KULKOSKY, Assistant Examiner

U.S. Cl. X.R.
260—33.4 R